UNITED STATES PATENT OFFICE.

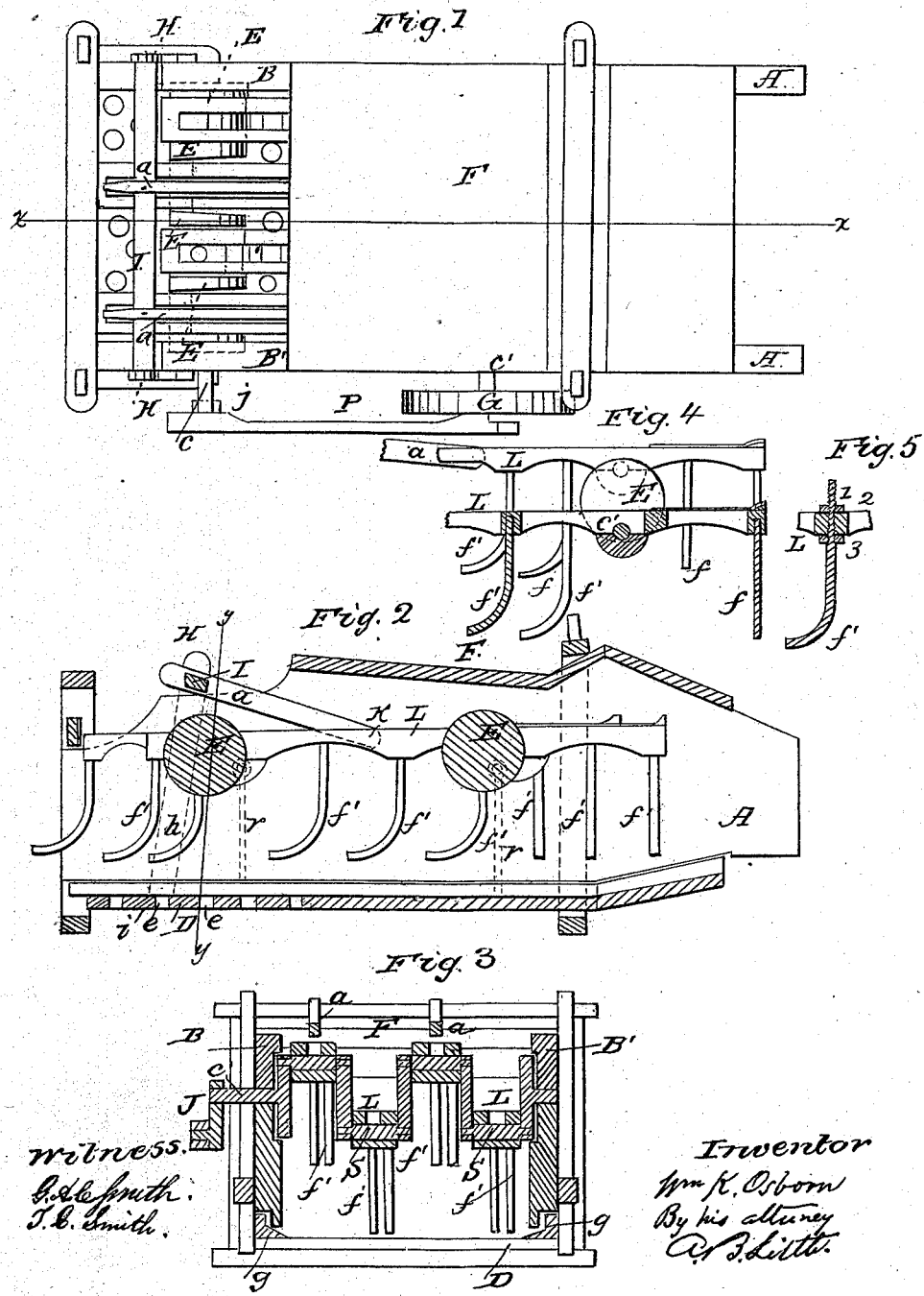

WILLIAM K. OSBORN, OF CHESTER, NEW JERSEY.

IMPROVEMENT IN STRAW-CARRIERS AND GRAIN-SEPARATORS.

Specification forming part of Letters Patent No. 35,250, dated May 13, 1862.

*To all whom it may concern:*

Be it known that I, WILLIAM K. OSBORN, of Chester, in the county of Morris and State of New Jersey, have invented certain new and useful Improvements in Straw-Carriers and Grain-Separators; and I do hereby declare that the following is a description thereof in terms which now seem to me sufficiently full, clear, and exact, reference being had to the annexed drawings, making a part of this specification, in which—

Figure I is a top view; Fig. II, a longitudinal section in the line $x\,x$ of Fig. I; Fig. III, a transverse section in the line $y\,y$ of Fig. II; Fig. IV, a detached view of the rakers and separators; Fig. V, a view showing the manner of securing the curved rake-teeth to the rake-heads.

The nature of my invention consists in combining together a series of four or more rakers and separators with peculiarly-formed teeth, and operating them in such a manner that while half of the rakes are holding the straw down upon the shaker the other half are pulling the straw up and separating it, so as to free the grain.

It also consists in the combination of such a series of rakes and separators so operated with the shaker of the machine and in making the teeth adjustable.

To enable others skilled in the art to make and use my invention, I will proceed to describe its construction and operation.

I prepare a trunk, F, the front end, A, of which is to be received into the rear end of the thrashing-cylinder frame. The sides B B' of the trunk are provided with bearings in which turn the journals of the two crank or cam shafts C C', arranged parallel with each other, and one near each end of the trunk. The cranks or cams E in this instance are four in number on each shaft; but there may be six or eight or any other number most advantageous. They are arranged with reference to each other, so that while one half on one shaft have their crank-pins S at their lowest point in the revolution of the said shaft, the other half have their crank-pins S' at their highest point, and the two sets of cranks on the two shafts are disposed alike.

Extending from crank-shaft C to crank-shaft C' are the rake-heads L, provided with boxes to receive the crank-pins S, from which depend the straight teeth $f$ and the curved teeth $f'$, which last are secured to rake-heads L by means of binding-nuts 2 and 3, in conjunction with the screw-thread 1, the one being above and the other below the rake-head, thus enabling me to adjust the distance between the curves of the teeth $f'$ and the shaker-bottom D for the purpose of accommodating them to the nature of the straw or to the quantity passing through the trunk. Suspended from the bottom of the trunk F by means of the rods $r$ is the shaker D, provided with perforations $e$ and with inclined sides $g$, rabbeted to the lower edges of the sides B B' of the trunk. Levers H are pivoted or fulcrumed to each side of the rear end of the trunk, as seen at $h$, with their lower ends connected with the shaker D at $i$, while their upper ends extend upwardly to the top of the trunk, where they are pivoted to each end of the cross-bar I. To this cross-bar are mortised the pitmen $a$, which extend forward and are connected at their other end by pins $k$ to the rake-heads L, which latter are provided with slots or mortises to receive them.

Power is communicated to this machine from the cylinder-shaft of a thrashing-machine by means of a belt passing over the band-wheel G. From thence it is conveyed to the second crank-shaft C by means of the pitman P, connected at one end by a wrist-pin to the band-wheel G and at the other to the crank J. The two series of cranks having been disposed as above described, it will be seen that the rake-heads rise and fall in horizontal planes, and that while one half are up or rising the other half are down or falling. The consequence of this is that as the straw and grain are delivered from the thrasher the straight teeth $f$ take them and carry them forward to the action of the curved teeth $f'$, a part of which hold the straw down upon the shaker while the rest tear it up and apart and free the grain, which, from the simultaneous operation of the shaker through its connecting-pitmen $a$ and levers H, falls through the openings $e$ into a proper receptacle perfectly cleaned.

Having thus described my invention and pointed out its mode of operation, what I claim therein as new, and desire to secure by Letters Patent of the United States, is—

1. The separate rake-heads L, when provided with straight and curved teeth, as described, and when combined with crank-shafts so arranged as to impart to them an alternate up and down motion, substantially as and for the purposes specified.

2. In combination with the above, the shaker D, when arranged for joint action with the rakes, in the manner substantially as set forth.

3. The curved teeth $f'$, when made adjustable, in the manner and for the purpose described.

WILLIAM K. OSBORN.

Witnesses:
ABRAHAM REYNOLDS,
CORTLAND PITNEY.